(No Model.)

N. G. POMEROY.
OIL CAN.

No. 475,151. Patented May 17, 1892.

WITNESSES:
Paul Jones
C. Sedgwick

INVENTOR
N. G. Pomeroy
BY Munn & Co.
ATTORNEYS

UNITED STATES PATENT OFFICE.

NOAH G. POMEROY, OF NEW HAVEN, CONNECTICUT.

OIL-CAN.

SPECIFICATION forming part of Letters Patent No. 475,151, dated May 17, 1892.

Application filed August 1, 1891. Serial No. 401,355. (No model.)

*To all whom it may concern:*

Be it known that I, NOAH G. POMEROY, of New Haven, in the county of New Haven and State of Connecticut, have invented a new and useful Improvement in Oil-Cans, of which the following is a full, clear, and exact description.

My invention relates to an improvement in oil-cans, and has for its object especially to provide an oil-can capable of being safely carried in the pocket without any of its contents spilling; and a further object of the invention is to so construct the can that it will be especially adapted for use in oiling the bearings of bicycles and other equivalent machines or vehicles, the nozzle of the can being so formed that it will clean the oil-apertures from any dust or dirt contained therein and in advance of the flow of oil, thus insuring the oil reaching the parts actually in frictional engagement.

Another object of the invention is to construct an oil-can of the character described in a simple, durable, and economic manner.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a perspective view of the body and cap of the oil-can, one removed from the other. Fig. 2 is a central longitudinal section through the body of the oil-can and its cap, and Fig. 3 is a detail view of the cleansing-plunger.

The body A of the oil-can is preferably made in the shape of a cylindrical casing closed at its lower end and provided at its upper end with an interiorly-threaded collar 10, the said collar being integral with or securely attached to the casing.

Beneath the collar, within the casing, a spring 11 is located, which is preferably a spiral or coil spring, and in the threaded aperture of the collar the threaded portion of the nozzle 12 of the can is screwed. The nozzle at its outer end is preferably made conical, and adjacent to its conical section an annular rib 13 is formed. A piston or cleansing rod 14 is loosely fitted in the nozzle and extends through it and some distance beyond its outer end. At the inner extremity of the piston or cleansing rod a disk 15 is fastened, which disk has a bearing upon the upper end of the spring 11 at its under face, the upper face being preferably provided with a cushion 16, acting as a valve to normally close the lower or inner end of the nozzle, as shown in Fig. 2. The nozzle is preferably provided just above its threaded portion with an attached disk 17, provided with a gasket 18, the said gasket being of a diameter essentially the same as the interior diameter of the casing. By this means it is rendered almost impossible for any oil to leak from around the nozzle, and when the inner valve-disk 15 is in its normal position oil is effectually prevented from passing out through the opening in the nozzle.

To positively insure a total absence of leakage when the can is carried in the pocket, its cap-section B is provided with an interior plug 19, of cork or like material, provided with a channel 20 of sufficient length to receive the outer projecting end of the cleansing rod or piston 14 when the valve-disk is in its normal position, and the lower end of this channel is flared to receive the outer end of the nozzle, as is likewise best shown in Fig. 2. The cap fits neatly over the body-section and is prevented from being pressed too far downward by forming a projection upon the exterior surface of the body.

In operation, when it is desired to lubricate a bearing, the cap-section is removed from the body-section and the rod 14 is inserted in the oiling-aperture and is manipulated to clear said aperture from dust or foreign matter that may have collected. When this has been accomplished and the surfaces to be lubricated have been reached, pressure is exerted upon the rod 14, whereupon its attached valve-disk compresses the spring 11 in the body of the can, and as the valve-disk leaves the nozzle the opening therein is uncovered and oil flows through said opening only in the quantity desired to the parts to be lubricated. The moment the can-nozzle is withdrawn from the oiling-opening the spring 11 forces the valve-disk to its normal position, closing the opening in the nozzle and forcing the rod 14 outward to be again brought into service or to enter the channel in the cap. It will be observed that the piston or cleansing rod is so constructed as to avoid absolutely any waste or leakage of oil.

It will be observed that the can is exceedingly simple and durable and that it may be economically manufactured, and, further, that it may be carried in the pocket with safety, as the oil cannot escape. As the disk 10 is of less diameter than the can, the oil will flow freely past it when it is pressed inward.

Having thus described my invention, I claim as new and desire to secure by Letters Patent—

1. A tubular oil-can having an internally-threaded collar 10 in its outer end, a threaded discharge-tube screwed thereto, a disk 15 within the can and having a rod 20 projecting out through the tube, a spiral spring 11, bearing against the bottom of the tube and against the under side of the disk, and the removable cover B, inclosing the discharge-nozzle, substantially as set forth.

2. In an oil-can, the combination, with the body thereof adapted to contain the oil, a nozzle, and a spring-pressed valve located below and adapted to close the nozzle-opening, of a rod attached to the valve and extending loosely through and beyond the outer end of the nozzle, and a cap adapted to close the nozzle end of the body, provided with a plug or filling channeled to receive the projecting end of the valve-rod and the outer extremity of the nozzle, as and for the purpose set forth.

NOAH G. POMEROY.

Witnesses:
Mrs. NOAH G. POMEROY,
THOS. J. OTELL.